United States Patent
Aoyama et al.

(10) Patent No.: US 9,353,277 B2
(45) Date of Patent: May 31, 2016

(54) WATER-BASED INK FOR INK-JET RECORDING, INK CARTRIDGE, AND INK-JET RECORDING APPARATUS

(71) Applicant: Brother Kogyo Kabushiki Kaisha, Nagoya-shi, Aichi-ken (JP)

(72) Inventors: Michiko Aoyama, Nagoya (JP); Mitsunori Maeda, Nagoya (JP); Chisato Okumura, Marugame (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 24 days.

(21) Appl. No.: 14/453,693

(22) Filed: Aug. 7, 2014

(65) Prior Publication Data

US 2015/0042733 A1 Feb. 12, 2015

(30) Foreign Application Priority Data

Aug. 7, 2013 (JP) ................. 2013-164021

(51) Int. Cl.
*B41J 2/21* (2006.01)
*B41J 2/01* (2006.01)
(Continued)

(52) U.S. Cl.
CPC ............... *C09D 11/38* (2013.01); *B41J 2/2107* (2013.01); *C08K 5/053* (2013.01); *C09D 11/322* (2013.01); *C08K 5/1535* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,609,671 | A | 3/1997 | Nagasawa |
| 5,837,045 | A | 11/1998 | Johnson et al. |

(Continued)

FOREIGN PATENT DOCUMENTS

| | | |
|---|---|---|
| JP | H08-003498 A | 1/1996 |
| JP | H10-077431 A | 3/1998 |

(Continued)

*Primary Examiner* — Manish S Shah
(74) *Attorney, Agent, or Firm* — Banner & Witcoff, Ltd.

(57) ABSTRACT

A water-based ink for ink-jet recording includes a pigment; water; 1,2-alkanediol; a compound including an isothiazoline ring; and a surfactant represented by a general formula (1):

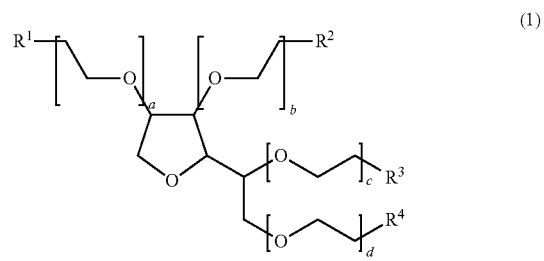

In the general formula (1); each of $R^1$, $R^2$, $R^3$, and $R^4$ is one of a hydroxyl group, saturated fatty acid having a number of carbon atoms of 12 to 18 and unsaturated fatty acid having a number of carbon atoms of 12 to 18; and a, b, c, and d are identical with each other or different from each other, and a, b, c, and d are numbers to fulfill $a+b+c+d \geq 20$.

12 Claims, 2 Drawing Sheets

(51) Int. Cl.
*C09D 11/38* (2014.01)
*C08K 5/053* (2006.01)
*C09D 11/322* (2014.01)
*C08K 5/1535* (2006.01)

(56) References Cited

U.S. PATENT DOCUMENTS

| | | | |
|---|---|---|---|
| 7,922,805 B2 | 4/2011 | Kowalski et al. | |
| 8,016,404 B2 | 9/2011 | Kato et al. | |
| 2004/0226477 A1* | 11/2004 | Hoshi | B41J 2/2107 347/100 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2010/0222472 A1* | 9/2010 | Morimoto | C09D 11/322 524/105 |
| 2012/0320124 A1* | 12/2012 | Saito | B41J 2/015 347/21 |

FOREIGN PATENT DOCUMENTS

| | | |
|---|---|---|
| JP | 2000-169772 A | 6/2000 |
| JP | 2000-513396 A | 10/2000 |
| JP | 2008-524400 A | 7/2008 |
| JP | 2008-246821 A | 10/2008 |
| JP | 2009-515007 A | 4/2009 |
| JP | 2010-065130 A | 3/2010 |
| WO | 9748769 A1 | 12/1997 |
| WO | 2006/066132 A2 | 6/2006 |

\* cited by examiner

WATER-BASED INK FOR INK-JET RECORDING, INK CARTRIDGE, AND INK-JET RECORDING APPARATUS

CROSS REFERENCE TO RELATED APPLICATION

The present application claims priority from Japanese Patent Application No. 2013-164021, filed on Aug. 7, 2013, the disclosure of which is incorporated herein by reference in its entirety.

BACKGROUND OF THE INVENTION

1. Field of the Invention

The present invention relates to a water-based ink for ink-jet recording, an ink cartridge, and an ink-jet recording apparatus.

2. Description of the Related Art

In relation to the water-based ink for ink-jet recording based on the use of a pigment (hereinafter referred to as "water-based pigment ink" in some cases), it has been suggested that an antifungal agent (fungicide) is added in order to suppress the clog-up of nozzles of an ink-jet head caused by the propagation of microorganisms such as fungi or the like (Japanese Patent Application Laid-open No. 10-77431).

SUMMARY OF THE INVENTION

In the meantime, further improvement in the chromaticness of a recorded matter is required for the water-based pigment ink, in addition to the suppression of propagation of microorganisms such as fungi or the like. The present inventors have found out that it is possible to improve the chromaticness of the recorded matter by adding a large amount of 1,2-alkanediol to the water-based pigment ink. However, if an antifungal agent and 1,2-alkanediol in an amount required to improve the chromaticness of the recorded matter are used in combination in the water-based pigment ink as described above, then the viscosity of the water-based pigment ink is increased, and the storage stability is lowered as well.

In view of the above, an object of the present teaching is to provide a water-based ink for ink-jet recording based on the use of a pigment in which the propagation of microorganisms such as fungi or the like is suppressed and the ink is also excellent in the chromaticness of a recorded matter and the storage stability without increasing the viscosity.

According to a first aspect of the present teaching, there is provided a water-based ink for ink-jet recording, including a pigment; water; 1,2-alkanediol; a compound including an isothiazoline ring; and a surfactant represented by a general formula (1):

In the general formula (1):
each of $R^1$, $R^2$, $R^3$, and $R^4$ is one of a hydroxyl group, saturated fatty acid having a number of carbon atoms of 12 to 18 and unsaturated fatty acid having a number of carbon atoms of 12 to 18; and a, b, c, and d are identical with each other or different from each other, and a, b, c, and d are numbers to fulfill $a+b+c+d \geq 20$.

According to a second aspect of the present teaching, there is provided an ink cartridge including the water-based ink for ink-jet recording as defined in the first aspect.

According to a third aspect of the present teaching, there is provided an ink-jet recording apparatus including the water-based ink for ink-jet recording as defined in the first aspect; an ink accommodating unit which accommodates the water-based ink; and an ink discharge mechanism which discharges the ink accommodated in the ink accommodating unit.

DESCRIPTION OF THE PREFERRED EMBODIMENTS

An explanation will be made about a water-based ink of the present teaching. The water-based ink of the present teaching contains the pigment and water.

In the present teaching, the pigment is not limited. The pigment is exemplified, for example, by carbon black, inorganic pigments, and organic pigments. The carbon black is exemplified, for example, by furnace black, lamp black, acetylene black, and channel black. The inorganic pigment may be exemplified, for example, by titanium oxide, iron oxide-based pigments, and carbon black-based pigments. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36. The water-based ink of the present teaching may be obtained such that the pigment as described above is dispersed in water by using a dispersing agent. For example, any general high molecular weight dispersing agent may be used as the dispersing agent. In the water-based ink of the present teaching, the pigment may be capsulated with a high molecular weight compound.

The pigment may be any self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, and phosphoric acid group is introduced into the pigment particles by means of the chemical bond directly or with any other group intervening therebetween. Those usable as the self-dispersible pigment include, for example, those in which the pigment is treated or processed in accordance with any method described, for example, in Japanese Patent Application Laid-open No. 8-3498 corresponding to U.S. Pat. No. 5,609,671, Japanese Patent Application Laid-open No. 2000-513396 (PCT) corresponding to U.S. Pat. No. 5,837,045, Japanese Patent Application Laid-open No. 2008-524400 (PCT) corresponding to United States Patent Application Publication No. 2006/0201380, and Japanese Patent Application Laid-open No. 2009-515007 (PCT) corresponding to United States Patent Application Publication Nos. 2007/0100023 and 2007/0100024. As for the raw material for the self-dispersible pigment, it is possible to use any one of inorganic pigments and organic pigments. The pigment, which is suitable to perform the treatment as described above, includes, for example, carbon blacks such as "MA8" and "MA100" produced by Mitsubishi Chemical Corporation. For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The water-based ink of the present teaching is the water-based ink which suppresses the increase in viscosity and the propagation of microorganisms such as fungi or the like and which is also excellent in the storage stability, without lowering the chromaticness of the recorded matter. Therefore, the present teaching is especially effective for the water-based ink based on the use of the pigment of the chromatic color (chromatic color pigment) for which the high chromaticness is required. The pigment of the chromatic color includes pigments other than pigments of white, black, and gray as achromatic colors, which is exemplified, for example, by yellow pigments, magenta pigments, and cyan pigments. Only one type of the pigment as described above may be used singly, or two or more types of the pigments as described above may be used in combination.

The solid content blending amount of the pigment (pigment solid content amount) with respect to the total amount of the water-based ink is not specifically limited, which can be appropriately determined, for example, on the basis of the desired optical density or the coloration or colorfulness. The pigment solid content is, for example, 0.1% by weight to 20% by weight, preferably 1% by weight to 15% by weight, and more preferably 2% by weight to 10% by weight.

The water-based ink may contain any coloring agent other than the pigment. The coloring agent other than the pigment is exemplified, for example, by dyes. It is also allowable that the water-based ink does not contain any coloring agent other than the pigment. The effect of the improvement in the chromaticness of the recorded matter brought about by 1,2-alkanediol is remarkable when the pigment is used as the coloring agent. It is speculated that 1,2-alkanediol functions to allow the pigment to remain on the surface of the recorded matter (for example, on the paper surface). Therefore, the present teaching is especially effective for the water-based ink which substantially contains only the pigment as the coloring agent (colorant), for example, the water-based ink in which 95% by weight to 100% by weight, preferably 99% by weight to 100% by weight of the coloring agent is the pigment.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

As described above, the water-based ink further contains 1,2-alkanediol, the compound including or having the isothiazoline ring, and the surfactant represented by the general formula (1). The water-based pigment ink, in which 1,2-alkanediol and the compound including the isothiazoline ring to function as the antifungal agent are used in combination, is allowed to further contain the surfactant represented by the general formula (1). Accordingly, it is possible to obtain the water-based ink for ink-jet recording in which the propagation of microorganisms such as fungi or the like is suppressed and the ink is also excellent in the chromaticness and the storage stability without increasing the viscosity. The mechanism, in which the viscosity is not raised and the storage stability is excellent as well owing to the surfactant represented by the general formula (1) contained therein, is speculated, for example, as follows. That is, it is considered that the ethylene oxide chains, which are long, which are directed in multiple directions, and which are included in the molecules of the surfactant represented by the general formula (1), enter the spaces or interstices between the pigment particles and the molecules of the compound including the isothiazoline ring, and thus the excellent storage stability is obtained as well without increasing the viscosity. This mechanism is based on the speculation, and the present teaching is not limited to and restricted by the speculation.

1,2-Alkanediol is not specifically limited, which may be either straight chain alkanediol or branched chain alkanediol. However, it is preferable to use straight chain alkanediol. If the number of carbon atoms of 1,2-alkanediol is not more than 6, the solubility in water is high. Therefore, it is preferable that the number of carbon atoms of 1,2-alkanediol is 2 to 6. 1,2-Alkanediol is exemplified, for example, by 1,2-ethanediol (1,2 EDL), 1,2-propanediol (1,2 PrDL), 1,2-butanediol (1,2 BDL), 1,2-pentanediol (1,2 PeDL), and 1,2-hexanediol (1,2 HDL). Further, as for 1,2-alkanediol as described above, the larger the number of carbon atoms is, the higher the hydrophobicity is. It is speculated that the action to allow the pigment to remain on the surface of the recorded matter is enhanced thereby, and the chromaticness of the recorded matter is more improved. Therefore, in view of the enhancement of the chromaticness of the recorded matter, the number of carbon atoms of 1,2-alkanediol is preferably 4 to 6. 1,2-Alkanediol, which has the number of carbon atoms of 4 to 6, is exemplified, for example, by 1,2-butanediol (1,2 BD), 1,2-pentanediol (1,2 PeDL), and 1,2-hexanediol (1,2 HDL). One type of 1,2-alkanediol as described above may be used singly, or two or more types of 1,2-alkanediols as described above may be used in combination.

It is preferable that the blending amount of 1,2-alkanediol (1,2-alkanediol ratio) with respect to the total amount of the water-based ink is not less than 8% by weight. When 1,2- alkanediol is 1,2-alkanediol having a number of carbon atoms of 4 to 6, and the 1,2-alkanediol ratio is not less than 8% by weight, then it is possible to obtain the water-based ink which is more excellent in the chromaticness. The 1,2-alkanediol ratio is more preferably 8% by weight to 25% by weight, and much more preferably 15% by weight to 25% by weight.

The compound including the isothiazoline ring is exemplified, for example, by 1,2-benzisothiazolin-3-one (BIT), 5-chloro-2-methylisothiazoline-3-one (CMIT), 2-methyl-4-isothiazoline-3-one (MIT), and derivatives thereof. BIT is especially preferred in view of the safety. One type of the compound including the isothiazoline ring as described above may be used singly, or two or more types of the compounds including the isothiazoline ring as described above may be used in combination. However, it is preferable that one type of the compound including the isothiazoline ring as described above is used singly. It is especially preferable to use 1,2-benzisothiazolin-3-one (BIT) singly.

The blending amount of the compound including the isothiazoline ring with respect to the total amount of the water-based ink is, for example, 0.01% by weight to 0.1% by weight, preferably 0.01% by weight to 0.05% by weight, and more preferably 0.01% by weight to 0.04% by weight.

In the general formula (1), each of $R^1$, $R^2$, $R^3$, and $R^4$ is a hydroxyl group or saturated fatty acid or unsaturated fatty acid having a number of carbon atoms of 12 to 18.

It is preferable that the saturated fatty acid or unsaturated fatty acid having the number of carbon atoms of 12 to 18 is, for example, lauric acid, myristic acid, palmitic acid, stearic acid, palmitoleic acid, oleic acid, ricinoleic acid, and linoleic acid. Lauric acid, stearic acid, and oleic acid are preferred.

In the general formula (1), a, b, c, and d may be identical with each other or different from each other, and a, b, c, and d are numbers to fulfill $a+b+c+d \geq 20$. It is preferable that $20 \leq a+b+c+d \leq 160$ is given.

As for the surfactant represented by the general formula (1), for example, it is also allowable to use any commercially available product. The commercially available product is exemplified, for example, by Rheodol (trade name) TW-L120 (polyoxyethylene sorbitan monolaurate), TW-O120V (polyoxyethylene sorbitan monooleate), 460 V (polyoxyethylene sorbitan tetraoleate), and TW-IS399C (polyoxyethylene sorbitan triisostearate) produced by Kao Corporation. One type of the surfactant represented by the general formula (1) may be used singly, or two or more types of the surfactants represented by the general formula (1) may be used in combination.

The blending amount of the surfactant represented by the general formula (1) with respect to the total amount of the water-based ink is, for example, 0.1% by weight to 7% by weight.

The water-based ink of the present teaching may further contain any surfactant other than the surfactant represented by the general formula (1), within a range in which the effect of the present teaching is provided. The surfactant other than the surfactant represented by the general formula (1) is preferably a nonionic surfactant in view of the storage stability. It is preferable that the surfactant represented by the general formula (1) is contained by not less than 50% by weight in the whole surfactant contained in the water-based ink.

In view of the further improvement in the chromaticness and in view of the suppression of the increase in the viscosity of the ink, it is preferable that 1,2-alkanediol having the number carbon atoms of 4 to 6 and the surfactant represented by the general formula (1) are blended in the water-based ink in accordance with the balance to fulfill the following conditions (A) to (C).

$15 \leq x \leq 25$     (A)

$y \geq -0.27x + 7.05$     (B)

$y \geq -0.6x + 16$     (C)

x: blending amount (% by weight) of 1,2-alkanediol having the number of carbon atoms of 4 to 6 with respect to the total amount of the water-based ink;
y: blending amount (% by weight) of the surfactant represented by the general formula (1) with respect to the total amount of the water-based ink.

In the water-based ink described above, it is preferable that the ratio (X/Z) of the blending amount (X % by weight) of 1,2-alkanediol with respect to the blending amount (Z % by weight) of the pigment is 0.96 to 4.9. Further, it is more preferable that the ratio (X/Z) is 2.8 to 4.9 in view of the acquisition of the high chromaticness.

In the water-based ink described above, it is preferable that the ratio (y/Z) of the blending amount (y % by weight) of the surfactant represented by the general formula (1) with respect to the blending amount (Z % by weight) of the pigment is 0.019 to 1.4.

The water-based ink may further contain a water-soluble organic solvent other than 1,2-alkanediol. The water-soluble organic solvent is exemplified, for example, by a moistening agent (humectant) which prevents the water-based ink from being dried at the nozzle forward end portion of the ink-jet head and a permeating agent (penetrant) which adjusts the drying speed on the recording medium.

The moistening agent described above is not specifically limited. The moistening agent is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycols; polyhydric alcohols such as alkylene glycols, glycerol, and trimethylolpropane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by diethylene glycol, triethylene glycol, dipropylene glycol, tripropylene glycol, and thiodiglycol. One type of the moistening agent as described above may be used singly, or two or more types of the moistening agents as described above may be used in combination. Among them, it is preferable to use polyhydric alcohol such as alkylene glycol and glycerol.

The blending amount of the moistening agent with respect to the total amount of the water-based ink is, for example, 0% by weight to 95% by weight, preferably 5% by weight to 80% by weight, and more preferably 5% by weight to 50% by weight.

The permeating agent is exemplified, for example, by glycol ether. The glycol ether is exemplified, for example, by ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the permeating agent as described above may be used singly, or two or more types of the permeating agents as described above may be used in combination.

The blending amount of the permeating agent with respect to the total amount of the water-based ink is, for example, 0% by weight to 20% by weight, preferably 0.1% by weight to 15% by weight, and more preferably 0.5% by weight to 10% by weight.

The water-based ink may further contain conventionally known additives, if necessary. The additive includes, for example, surfactants other than the surfactant represented by the general formula (1), pH-adjusting agents, viscosity-adjusting agents, surface tension-adjusting agents, and antifungal agents (fungicides) other than the compound including the isothiazoline ring. The viscosity-adjusting agent includes, for example, polyvinyl alcohol, cellulose, and water-soluble resin.

The water-based ink described above can be prepared, for example, such that the pigment, water, 1,2-alkanediol, the compound including the isothiazoline ring, the surfactant represented by the general formula (1), and optionally other additive components are mixed uniformly or homogeneously in accordance with any conventionally known method, and undissolved matters are removed by means of a filter or the like.

As described above, according to the present teaching, the surfactant, which is represented by the general formula (1), is further contained in the water-based pigment ink in which 1,2-alkanediol and the compound including the isothiazoline ring to function as the antifungal agent are used in combination. Thus, it is possible to obtain the water-based ink for ink-jet recording in which the propagation of microorganisms such as fungi or the like is suppressed and the ink is also excellent in the chromaticness and the storage stability without increasing the viscosity.

Next, the ink cartridge of the present teaching will be explained. The ink cartridge of the present teaching resides in an ink cartridge including a water-based ink for ink-jet recording, wherein the water-based ink is the water-based ink for ink-jet recording of the present teaching. For example, any conventionally known main body can be used as the main body of the ink cartridge.

Next, the ink-jet recording apparatus and the ink-jet recording method of the present teaching will be explained.

The ink-jet recording apparatus of the present teaching resides in an ink-jet recording apparatus including an ink accommodating unit and an ink discharge mechanism for discharging an ink accommodated in the ink accommodating unit by the ink discharge mechanism, wherein the water-based ink for ink-jet recording of the present teaching is accommodated in the ink accommodating unit.

The ink-jet recording method of the present teaching resides in an ink-jet recording method for performing recording by discharging a water-based ink onto a recording medium in accordance with an ink-jet system, wherein the water-based ink for ink-jet recording of the present teaching is used as the water-based ink.

The ink-jet recording method of the present teaching can be carried out, for example, by using the ink-jet recording apparatus of the present teaching. The recording includes, for example, the letter (character) printing, the image printing, and the printing (print or presswork).

Figure 1:
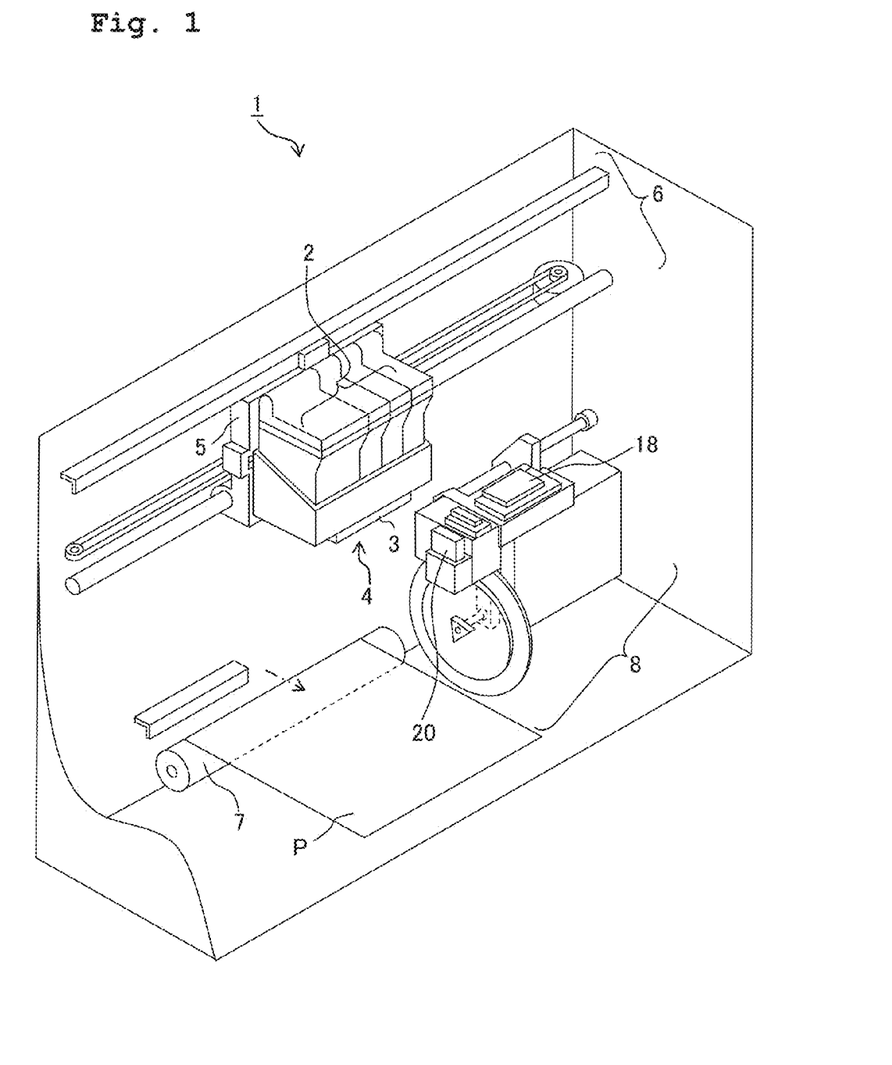
FIG. 1 shows a schematic perspective view illustrating an exemplary construction of an ink-jet recording apparatus according to the present teaching.

FIG. 1 shows an exemplary construction of the ink-jet recording apparatus of the present teaching. As shown in FIG. 1, the ink-jet recording apparatus 1 includes, as main constitutive components, four ink cartridges 2, an ink discharge mechanism (ink-jet head) 3, a head unit 4, a carriage 5, a driving unit 6, a platen roller 7, and a purge unit 8.

Each of the four ink cartridges 2 contains one color of each of four colors of water-based inks of yellow, magenta, cyan, and black. For example, at least one of the four color water-based inks is the water-based ink for ink-jet recording of the present teaching. The ink-jet head 3, which is installed for the head unit 4, performs the recording on the recording medium (for example, recording paper) P. The four ink cartridges 2 and the head unit 4 are carried on the carriage 5. The driving unit 6 reciprocatively moves the carriage 5 in the straight line direction. For example, those conventionally known can be used as the driving unit 6 (see, for example, Japanese Patent Application Laid-open No. 2008-246821 corresponding to United States Patent Application Publication No. 2008/0241398). The platen roller 7 extends in the reciprocating direction of the carriage 5, and the platen roller 7 is arranged opposingly to the ink-jet head 3.

The purge apparatus 8 sucks any defective ink containing, for example, bubbles accumulated in the ink-jet head 3. For example, those conventionally known can be used as the purge apparatus 8 (see, for example, Japanese Patent Application Laid-open No. 2008-246821 corresponding to United States Patent Application Publication No. 2008/0241398).

A wiper member 20 is arranged adjacently to the purge apparatus 8 on the platen roller 7 side of the purge apparatus 8. The wiper member 20 is formed to have a spatula-shaped form. The wiper member 20 wipes out the nozzle-formed surface of the ink-jet head 3 in accordance with the movement of the carriage 5. With reference to FIG. 1, a cap 18 covers a plurality of nozzles of the ink-jet head 3 which is to be returned to the reset position when the recording is completed, in order to prevent the water-based inks from being dried.

In the ink-jet recording apparatus 1 of this embodiment, the four ink cartridges 2 are carried on one carriage 5 together with the head unit 4. However, the present teaching is not limited thereto. In the ink-jet recording apparatus described above, each of the cartridges of the four ink cartridges 2 may be carried on any carriage distinct from the head unit 4. Alternatively, it is also allowable that the respective cartridges of the four ink cartridges 2 are not carried on the carriage 5, and they are arranged and fixed in the ink-jet recording apparatus. In the embodiments as described above, for example, the respective cartridges of the four ink cartridges 2 are connected to the head unit 4 carried on the carriage 5, for example, by means of tubes or the like, and the water-based inks are supplied from the respective cartridges of the four ink cartridges 2 to the head unit 4.

The ink-jet recording, which is based on the use of the ink-jet recording apparatus 1, is carried out, for example, as follows. At first, the recording paper P is fed from a paper feed cassette (not shown) provided at a side portion or a lower portion of the ink-jet recording apparatus 1. The recording paper P is introduced into the space between the ink-jet head 3 and the platen roller 7. The predetermined recording is performed on the introduced recording paper P by means of the water-based inks discharged from the ink-jet head 3. As for the water-based ink of the present teaching, the increase in viscosity is suppressed, and the storage stability is excellent as well. Therefore, the water-based ink of the present teaching can be stably discharged from the ink-jet head 3. The recording paper P after the recording is discharged from the ink-jet recording apparatus 1. The recorded matter, which is recorded by using the water-based ink of the present teaching, is excellent in chromaticness. A paper feed mechanism and a paper discharge mechanism for the recording paper P are omitted from the illustration in FIG. 1.

The apparatus shown in FIG. 1 adopts the serial type ink-jet head. However, the present teaching is not limited thereto. The ink-jet recording apparatus may be an apparatus which adopts a line type ink-jet head.

EXAMPLES

Next, Examples of the present teaching will be explained together with Comparative Examples. The present teaching is not limited to and restricted by Examples and Comparative Examples described below.

Examples 1 to 26 and Comparative Examples 1 to 8

Ink solvents were obtained by uniformly mixing components except for the self-dispersible pigment contained in ink water-based ink compositions (Table 2 and Table 3). Subsequently, the ink solvents were added to the self-dispersible pigment dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based inks for ink-jet recording of Examples 1 to 26 and Comparative Examples 1 to 8 were obtained.

In relation to the water-based inks of Examples and Comparative Examples, (a) the evaluation of the chromaticness, (b) the evaluation of the storage stability, (c) the evaluation of the fungus resistance (antifungal performance), and (d) the overall evaluation were carried out in accordance with the following methods.

(a) Evaluation of Chromaticness

Each of the water-based inks of Examples and Comparative Examples was subjected to the coating to an area of about 5 cm (width)×about 10 cm (length) at a ratio of about 20 g/m² by using a bar coater on regular paper (Hammer Mill Laser Print 241b produced by International Paper), followed by being dried to prepare a sample for evaluation. The chromaticness (C*) of the sample for evaluation was measured by using a spectrophotometer, SpectroEye produced by X-Rite (light source: $D_{50}$, angle of field: 2°, density: ANSI T), and the evaluation was performed in accordance with the following evaluation criteria.

(b) Evaluation of Storage Stability

The viscosity of each of the water-based inks of Examples and Comparative Examples was measured under a condition of measuring temperature of 25° C. by using a viscometer (TVE-25 type produced by TOKI SANGYO CO., LTD.). Subsequently, the water-based ink was distinctly introduced into a hermetically sealed vial, followed by being stored for 3 days in an environment of temperature of 60° C. Subsequently, the viscosity of the water-based ink after the storage was measured in the same manner as measured before the storage. The viscosity increase ratio (%) of the water-based ink after the storage with respect to the water-based ink before the storage was determined, and the storage stability was evaluated in accordance with the following evaluation criteria.

<Evaluation Criteria for Storage Stability Evaluation>
 A: viscosity increase ratio was less than 1%;
 B: viscosity increase ratio was not less than 1% and less than 100%;
 C: viscosity increase ratio was not less than 100%.

(c) Evaluation of Fungus Resistance (Antifungal Performance)

The water-based ink of each of Examples and Comparative Examples was left to stand at ordinary temperature for 4 weeks in an open system, and then the water-based ink was applied to Food Stamp Standard Method Agar (produced by NISSUI PHARMACEUTICAL CO., LTD.), followed by being stored for 3 days in an environment of temperature of 35° C. After that, it was visually confirmed whether or not any colony of fungus appeared on Standard Method Agar, and the fungus resistance was evaluated in accordance with the following evaluation criteria.

<Evaluation Criteria for Fungus Resistance Evaluation>
 G: colony did not appeared;
 NG: colony appeared.

(d) Overall Evaluation

The overall evaluation was performed in accordance with the following evaluation criteria on the basis of the results of (a) to (c) described above in relation to the respective water-based inks.

<Evaluation Criteria for Overall Evaluation>
 G: Both of the evaluation results of (a) and (b) were not less than A, and the evaluation result of (c) was G.
 NG: Any one of the evaluation results of (a) and (b) was not more than B or the evaluation result of (c) was NG, or it was impossible to prepare any water-based ink and it was impossible to carry out the evaluation for (a) to (c).

Table 2 shows the water-based ink compositions and the evaluation results of the water-based inks of Examples. Further, Table 3 shows the water-based ink compositions and the evaluation results of the water-based inks of Comparative Examples.

TABLE 1

|     | Water-based magenta ink | Water-based yellow ink | Water-based cyan ink |
| --- | --- | --- | --- |
| AAA | chromaticness (C*) was not less than 61 | — | — |
| AA | chromaticness (C*) was not less than 60 and less than 61 | chromaticness (C*) was not less than 75 | chromaticness (C*) was not less than 52.5 |
| A | chromaticness (C*) was not less than 59 and less than 60 | chromaticness (C*) was less than 75 | chromaticness (C*) was less than 52.5 |
| B | chromaticness (C*) was less than 59 | — | — |

Note that in TABLE 2:

*1: self-dispersible magenta pigment; produced by Cabot Corporation; numerical values in table represent pigment solid content amounts;

*2: self-dispersible yellow pigment; produced by Cabot Corporation; numerical values in table represent pigment solid content amounts;

*3: self-dispersible cyan pigment; produced by Cabot Corporation; numerical values in table represent pigment solid content amounts;

*4: BIT; produced by Arch Chemicals; numerical values in table represent active ingredient amounts;
*5: surfactant represented by general formula (1) (a+b+c+d=20); produced by Kao Corporation;
*6: surfactant represented by general formula (1) (a+b+c+d=20); produced by Kao Corporation;
*7: surfactant represented by general formula (1) (a+b+c+d=60); produced by Kao Corporation;
*8: surfactant represented by general formula (1) (a+b+c+d=160); produced by Kao Corporation.
Note that in TABLE 3:
*1: self-dispersible magenta pigment; produced by Cabot Corporation; numerical values in table represent pigment solid content amounts;
*4: BIT; produced by Arch Chemicals; numerical values in table represent active ingredient amounts;
*5: surfactant represented by general formula (1) (a+b+c+d=20); produced by Kao Corporation;
*9: surfactant in which a+b+c+d=6 is given in general formula (1); produced by Kao Corporation;
*10: surfactant in which a+b+c+d=6 is given in general formula (1); produced by Kao Corporation;
 11: nonionic surfactant; produced by Dai-ichi Kogyo Seiyaku Co. Ltd.;
*12: nonionic surfactant; produced by Dai-ichi Kogyo Seiyaku Co. Ltd.;
*13: anionic surfactant; produced by Kao Corporation, numerical values in table represent active ingredient amounts;
*14: anionic surfactant; produced by Kao Corporation, numerical values in table represent active ingredient amounts;
*15: ink was not formed.

Figure 2:
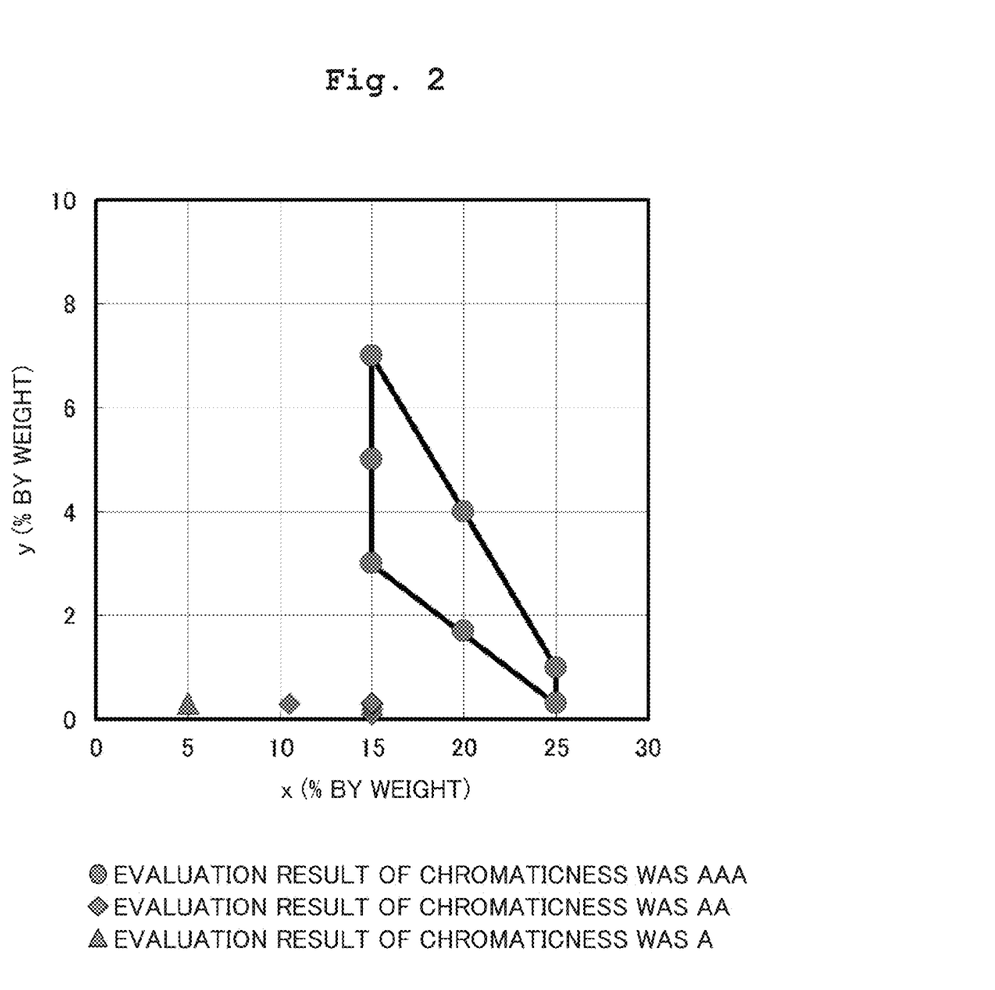
FIG. 2 shows relationships between compositions of water-based inks of Examples 1 to 11 and Examples 14 to 26 and evaluation results of the respective water-based inks.

Further, with reference to FIG. 2, the horizontal axis (x) represents the blending amount (x % by weight) of 1,2-alkanediol in the water-based ink, and the vertical axis (y) represents the blending amount (y % by weight) of the surfactant represented by the general formula (1) in the water-based ink. In FIG. 2, the following marks, which were based on the evaluation results of the respective water-based inks, were plotted at positions to indicate the compositions of the water-based inks of Examples 1 to 11 and Examples 14 to 26. In the water-based inks of Examples 1 to 11 and Examples 14 to 26, 1,2-alkanediols having the numbers of carbon atoms of 4 to 6 are used. FIG. 2 also shows the range in which 1,2-alkanediol and the surfactant represented by the general formula (1) fulfill the conditions of (A) to (C) described above.

<Marks in FIG. 2>
○ (circle): evaluation result of chromaticness was AAA.
◇ (diamond): evaluation result of chromaticness was AA.
Δ (triangle): evaluation result of chromaticness was A.

TABLE 2

|  |  | Example | | | | | | | | |
|---|---|---|---|---|---|---|---|---|---|---|
|  |  | 1 | 2 | 3 | 4 | 5 | 6 | 7 | 8 | 9 |
| Water-based ink composition (% by weight) | CAB-O-JET (trade name) 465M (*1) | 5.2 | 5.2 | 5.2 | 5.2 | 5.2 | 5.2 | 5.2 | 5.2 | 5.2 |
|  | CAB-O-JET (trade name) 470Y (*2) | — | — | — | — | — | — | — | — | — |
|  | CAB-O-JET (trade name) 450C (*3) | — | — | — | — | — | — | — | — | — |
|  | Proxel GXL(S) (*4) | 0.03 | 0.03 | 0.03 | 0.03 | 0.03 | 0.03 | 0.03 | 0.03 | 0.03 |
|  | Glycerol | 20 | 20 | 20 | 20 | 20 | 20 | 17 | 10 | 5 |
|  | 1,2 HDL | 15 | 15 | 15 | 15 | 15 | 15 | 15 | 15 | 15 |
|  | 1,2 PeDL | — | — | — | — | — | — | — | — | — |
|  | 1,2 BDL | — | — | — | — | — | — | — | — | — |
|  | 1,2 PrDL | — | — | — | — | — | — | — | — | — |
|  | 1,2 EDL | — | — | — | — | — | — | — | — | — |
|  | Rheodol (trade name) TW-L120 (*5) | 0.3 | — | — | — | 0.1 | 0.2 | 3 | 5 | 7 |
|  | Rheodol (trade name) TW-O120V (*6) | — | 0.3 | — | — | — | — | — | — | — |
|  | Rheodol (trade name) 460V (*7) | — | — | 0.3 | — | — | — | — | — | — |
|  | Rheodol (trade name) TW-IS399C (*8) | — | — | — | 0.3 | — | — | — | — | — |
|  | Water | balance | balance | balance | balance | balance | balance | balance | balance | balance |
| Evaluation | Chromaticness | AA | AA | AA | AA | AA | AA | AAA | AAA | AAA |
|  | Storage stability | A | A | A | A | A | A | A | A | A |
|  | Fungus resistance | G | G | G | G | G | G | G | G | G |
|  | Overall | G | G | G | G | G | G | G | G | G |

|  |  | Example | | | | | | | | |
|---|---|---|---|---|---|---|---|---|---|---|
|  |  | 10 | 11 | 12 | 13 | 14 | 15 | 16 | 17 | 18 |
| Water-based ink composition (% by weight) | CAB-O-JET (trade name) 465M (*1) | 5.2 | 5.2 | 5.2 | 5.2 | 5.2 | 5.2 | 5.2 | 5.2 | 5.2 |
|  | CAB-O-JET (trade name) 470Y (*2) | — | — | — | — | — | — | — | — | — |
|  | CAB-O-JET (trade name) 450C (*3) | — | — | — | — | — | — | — | — | — |
|  | Proxel GXL(S) (*4) | 0.03 | 0.03 | 0.03 | 0.03 | 0.03 | 0.03 | 0.03 | 0.03 | 0.03 |
|  | Glycerol | 20 | 20 | 20 | 20 | 25 | 25 | 10 | 5 | 5 |
|  | 1,2 HDL | — | — | — | — | 5 | 10.5 | 20 | 20 | 25 |
|  | 1,2 PeDL | 15 | — | — | — | — | — | — | — | — |
|  | 1,2 BDL | — | 15 | — | — | — | — | — | — | — |
|  | 1,2 PrDL | — | — | 15 | — | — | — | — | — | — |

TABLE 2-continued

|  |  |  |  |  |  |  |  |  |  |
|---|---|---|---|---|---|---|---|---|---|
|  | 1,2 EDL | — | — | — | 15 | — | — | — | — | — |
|  | Rheodol (trade name) TW-L120 (*5) | 0.3 | — | 0.3 | — | 0.3 | 0.3 | 1.7 | 4 | — |
|  | Rheodol (trade name) TW-O120V (*6) | — | 0.3 | — | 0.3 | — | — | — | — | 0.3 |
|  | Rheodol (trade name) 460V (*7) | — | — | — | — | — | — | — | — | — |
|  | Rheodol (trade name) TW-IS399C (*8) | — | — | — | — | — | — | — | — | — |
|  | Water | balance | balance | balance | balance | balance | balance | balance | balance | balance |
| Evaluation | Chromaticness | AA | AA | A | A | A | AA | AAA | AAA | AAA |
|  | Storage stability | A | A | A | A | A | A | A | A | A |
|  | Fungus resistance | G | G | G | G | G | G | G | G | G |
|  | Overall | G | G | G | G | G | G | G | G | G |

|  |  | Example |||||||| 
|---|---|---|---|---|---|---|---|---|---|
|  |  | 19 | 20 | 21 | 22 | 23 | 24 | 25 | 26 |
| Water-based ink composition (% by weight) | CAB-O-JET (trade name) 465M (*1) | 5.2 | 5.2 | 5.2 | 5.2 | — | — | — | — |
|  | CAB-O-JET (trade name) 470Y (*2) | — | — | — | — | 3.5 | 3.5 | — | — |
|  | CAB-O-JET (trade name) 450C (*3) | — | — | — | — | — | — | 3.5 | 3.5 |
|  | Proxel GXL(S) (*4) | 0.03 | 0.03 | 0.04 | 0.01 | 0.03 | 0.03 | 0.03 | 0.03 |
|  | Glycerol | 3 | 20 | 20 | 20 | 30 | 25 | 30 | 25 |
|  | 1,2 HDL | 25 | 15 | 15 | 15 | 5 | 15 | 5 | 15 |
|  | 1,2 PeDL | — | — | — | — | — | — | — | — |
|  | 1,2 BDL | — | — | — | — | — | — | — | — |
|  | 1,2 PrDL | — | — | — | — | — | — | — | — |
|  | 1,2 EDL | — | — | — | — | — | — | — | — |
|  | Rheodol (trade name) TW-L120 (*5) | — | 0.15 | 0.3 | 0.3 | 0.3 | 0.3 | 0.3 | 0.3 |
|  | Rheodol (trade name) TW-O120V (*6) | 1 | 0.15 | — | — | — | — | — | — |
|  | Rheodol (trade name) 460V (*7) | — | — | — | — | — | — | — | — |
|  | Rheodol (trade name) TW-IS399C (*8) | — | — | — | — | — | — | — | — |
|  | Water | balance | balance | balance | balance | balance | balance | balance | balance |
| Evaluation | Chromaticness | AAA | AA | AA | AA | A | AA | A | AA |
|  | Storage stability | A | A | A | A | A | A | A | A |
|  | Fungus resistance | G | G | G | G | G | G | G | G |
|  | Overall | G | G | G | G | G | G | G | G |

TABLE 3

|  |  | Comparative Example |||||||| 
|---|---|---|---|---|---|---|---|---|---|
|  |  | 1 | 2 | 3 | 4 | 5 | 6 | 7 | 8 |
| Water-based ink composition. (% by weight) | CAB-O-JET (trade name) 465M (*1) | 5.2 | 5.2 | 5.2 | 5.2 | 5.2 | 5.2 | 5.2 | 5.2 |
|  | Proxel GXL(S) (*4) | 0.03 | 0.03 | 0.03 | 0.03 | 0.03 | 0.03 | 0.03 | 0.03 |
|  | Glycerol | 20 | 30 | 20 | 20 | 20 | 20 | 20 | 20 |
|  | 1,2 HDL | 15 | — | 15 | 15 | 15 | 15 | 15 | 15 |
|  | Rheodol (trade name) TW-L120 (*5) | — | 0.3 | — | — | — | — | — | — |
|  | Rheodol (trade name) TW-S106V (*9) | — | — | 0.1 | — | — | — | — | — |
|  | Rheodol (trade name) TW-O106V (*10) | — | — | — | 0.1 | — | — | — | — |
|  | DK Ester (trade name) F-160 (*11) | — | — | — | — | 0.3 | — | — | — |
|  | DK Ester (trade name) SS (*12) | — | — | — | — | — | 0.3 | — | — |
|  | PELEX (trade name) NB-L (*13) | — | — | — | — | — | — | 0.3 | — |
|  | DEMOL (trade name) NL (*14) | — | — | — | — | — | — | — | 0.3 |
|  | Water | balance | balance | balance | balance | balance | balance | balance | balance |
| Evaluation | Chromaticness | AA | B | *15 | *15 | AA | AA | A | A |
|  | Storage stability | B | A | | | B | B | C | C |
|  | Fungus resistance | G | G | | | G | G | G | G |
|  | Overall | NG | NG | NG | NG | NG | NG | NG | NG |

As shown in Table 2, all results of the chromaticness evaluation, the storage stability evaluation, and the fungus resistance evaluation were satisfactory in Examples 1 to 26. Results of the chromaticness evaluation were "AA" or "AAA" and the results were more satisfactory in Examples 1 to 11, 15 to 22, 24 and 26 in which 1,2-alkanediols having the numbers of carbon atoms of 4 to 6 were used in the amounts of not less than 8% by weight. Further, as shown in FIG. 2, results of the chromaticness evaluation were "AAA" and the results were especially satisfactory in Examples 7 to 9 and 16 to 19 in which 1,2-alkanediol having the number of carbon atoms of 4 to 6 and the surfactants represented by the general formula (1) were blended to fulfill the conditions of (A) to (C) described above.

In Examples 1 to 26, the ratio (X/Z) of the blending amount (X % by weight) of 1,2-alkanediol with respect to the blending amount (Z % by weight) of the pigment in the water-based ink was within a range of 0.96 to 4.9, and the ratio (y/Z) of the blending amount (y % by weight) of the surfactant represented by the general formula (1) with respect to the blending amount (Z % by weight) of the pigment was within a range of 0.019 to 1.4. Further, in Examples 7 to 9 and Examples 16 to 19 in which the results of the chromaticness evaluation were especially satisfactory, the ratio (X/Z) of the blending amount (X % by weight) of 1,2-alkanediol with respect to the blending amount (Z % by weight) of the pigment was within a range of 2.8 to 4.9.

On the other hand, as shown in Table 3, a result of the storage stability evaluation was unsatisfactory in Comparative Example 1 in which the surfactant represented by the general formula (1) was not used. A result of the chromaticness evaluation was unsatisfactory in Comparative Example 2 in which 1,2-alkanediol was not used. In Comparative Examples 3 and 4 in which the surfactants to give a+b+c+d=6 in the general formula (1) were used, undissolved matters appeared, it was impossible to form any water-based ink, and it was impossible to carry out the chromaticness evaluation and the storage stability evaluation. Further, in Comparative Examples 5 and 6 in which the nonionic surfactants were used in place of the surfactant represented by the general formula (1), results of the storage stability evaluation were unsatisfactory. In Comparative Examples 7 and 8 in which the anionic surfactants were used in place of the surfactant represented by the general formula (1), results of the storage stability evaluation were extremely unsatisfactory.

As described above, in the water-based ink of the present teaching, the propagation of microorganisms such as fungi or the like is suppressed, and the chromaticness and the storage stability are excellent as well, without increasing the viscosity. The way of use of the water-based ink of the present teaching is not specifically limited. The water-based ink of the present teaching is widely applicable to various types of the ink-jet recording.

What is claimed is:

1. A water-based ink for ink-jet recording, comprising:
a pigment;
water;
1,2-alkanediol;
a compound including an isothiazoline ring; and
a surfactant represented by a general formula (1):

wherein in the general formula (1):
each of $R^1$, $R^2$, $R^3$, and $R^4$ is one of a hydroxyl group, saturated fatty acid having a number of carbon atoms of 12 to 18 and unsaturated fatty acid having a number of carbon atoms of 12 to 18;
a, b, c, and d are identical with each other or different from each other, and a, b, c, and d are numbers to fulfill a+b+c+d≥20;
the 1,2-alkanediol has a number of carbon atoms of 4 to 6; and
a blending amount (x % by weight) of 1,2-alkanediol and a blending amount (y % by weight) of the surfactant represented by the general formula (1) in the water-based ink fulfill the following conditions (A) to (C):

$$15 \leq x \leq 25 \quad (A)$$

$$y \geq -0.27x + 7.05 \quad (B)$$

$$y \leq -0.6x + 16. \quad (C)$$

2. The water-based ink for ink-jet recording according to claim 1, wherein the 1,2-alkanediol is straight chain alkanediol.

3. The water-based ink for ink-jet recording according to claim 1, wherein the 1,2-alkanediol is selected from the group consisting of 1,2-butanediol, 1,2-pentanediol, 1,2-hexanediol, and a combination thereof.

4. The water-based ink for ink-jet recording according to claim 1, wherein the compound including the isothiazoline ring is selected from the group consisting of 1,2-benzisothiazolin-3-one, 5-chloro-2-methylisothiazoline-3-one, 2-methyl-4-isothiazoline-3-one, and derivatives thereof, and a combination thereof.

5. The water-based ink for ink-jet recording according to claim 1, wherein the compound including the isothiazoline ring is 1,2-benzisothiazolin-3-one.

6. The water-based ink for ink-jet recording according to claim 1, wherein the compound including the isothiazoline ring is contained in the water-based ink by 0.01% by weight to 0.1% by weight.

7. The water-based ink for ink-jet recording according to claim 1, wherein the surfactant represented by the general formula (1) is at least one selected from the group consisting of polyoxyethylene sorbitan monolaurate, polyoxyethylene sorbitan monooleate, polyoxyethylene sorbitan tetraoleate, and polyoxyethylene sorbitan triisostearate.

8. The water-based ink for ink-jet recording according to claim 1, wherein the surfactant represented by the general formula (1) is contained in the water-based ink by 0.1% by weight to 7% by weight.

9. The water-based ink for ink-jet recording according to claim 1, wherein the pigment is a chromatic color pigment.

10. The water-based ink for ink-jet recording according to claim 9, wherein the pigment is at least one selected from the group consisting of yellow pigments, magenta pigments, and cyan pigments.

11. An ink cartridge comprising the water-based ink for ink-jet recording as defined in claim 1.

12. An ink-jet recording apparatus comprising:
the water-based ink for ink-jet recording as defined in claim 1;
an ink accommodating unit which accommodates the water-based ink; and
an ink discharge mechanism which discharges the ink accommodated in the ink accommodating unit.

* * * * *